(12) United States Patent
Kirk et al.

(10) Patent No.: US 6,527,923 B2
(45) Date of Patent: Mar. 4, 2003

(54) BIFURCATED ELECTRODE OF USE IN ELECTROLYTIC CELLS

(76) Inventors: Donald W. Kirk, Dept. Chem. Eng. and Applied Chemistry, University of Toronto, 200 College St, Room 246, Toronto, Ontario (CA), M5S 3E5; John W Graydon, Dept. of Chem Eng. & Applied Chemistry, University of Toronto, 200 College St., Room 246, Toronto, Ontario (CA), M5S 3E5

( * ) Notice: Subject to any disclaimer, the term of this patent is extended or adjusted under 35 U.S.C. 154(b) by 98 days.

(21) Appl. No.: 09/813,483

(22) Filed: Mar. 22, 2001

(65) Prior Publication Data

US 2002/0079216 A1 Jun. 27, 2002

(51) Int. Cl.[7] .............................................. C25B 11/00
(52) U.S. Cl. ................... 204/284; 204/288; 204/288.2; 204/289; 204/280; 204/275.1; 204/278; 204/278.5
(58) Field of Search ................................ 204/280, 284, 204/288, 288.2, 289, 275.1, 278, 278.5

(56) References Cited

U.S. PATENT DOCUMENTS

| | | |
|---|---|---|
| 3,652,431 A | 3/1972 | Reynolds |
| 4,042,481 A | 8/1977 | Kelly |
| 4,389,298 A * | 6/1983 | Pellegri ........................ 204/288 |
| 4,424,106 A | 1/1984 | Rossoshinsky et al. |
| 4,464,242 A | 8/1984 | Boulton |
| 4,469,580 A | 9/1984 | Deborski et al. |
| 5,480,515 A | 1/1996 | Gallien |
| 5,665,211 A | 9/1997 | Leppanen et al. |
| 5,733,422 A | 3/1998 | Lin |
| 6,080,290 A | 6/2000 | Stuart et al. |

* cited by examiner

Primary Examiner—Bruce F. Bell
(74) Attorney, Agent, or Firm—Jeffrey S. Melcher; Manelli Denison & Selter, PLLC

(57) ABSTRACT

An electrode of use in electrolytic cells, particularly water electrolyser cells for the production of hydrogen, and comprising an electrically conductive first metal sheet having an electrochemically active gas-evolving planar surface; an electrically conductive second metal electrochemically active gas-evolving screen intimately adjacent and parallel to the planar surface to define an electrolyte and gas-evolving chamber between the sheet and the screen having a narrow width. The electrode provides improvements in voltage and efficiency, longer-term electrode stability and opportunity for periodic depolarization.

11 Claims, 3 Drawing Sheets

BIFURCATED ELECTRODE OF USE IN ELECTROLYTIC CELLS

FIELD OF THE INVENTION

This invention relates to bifurcated metal electrodes, particularly formed of nickel of use in electrolytic cells, particularly water electrolyser cells for the production of hydrogen.

BACKGROUND OF THE INVENTION

In the field of electrolysis, there are two types of electrochemical cell stacks, namely, monopolar cell stacks and bipolar cell stacks. Bipolar cells have electrodes that operate with one side of the electrode as an anode while the other side operates as a cathode. Monopolar electrodes operate with one side or both sides as either an anode or as a cathode, but not both. The difference in these electrode types means that bipolar cells are connected in series with only 2 electrical connections one at each end of the cell stack while monopolar cells have multiple parallel type electrical connections. Stack construction is simpler and usually less expensive for bipolar cells than for monopolar cells.

With either type of aforesaid cell, electrolyte channel(s) must be present for each electrode. For cells which produce products at the anode and cathode surfaces that should not be mixed, a membrane, diaphragm or separator is placed in the electrolyte channel which separates the cell into anolyte and catholyte compartments. The membrane allows only selective ions to pass between compartments, the diaphragm allows electrolyte to pass but prevents gaseous products from passing between compartments, while a separator can be used to isolate cell compartments in some monopolar designs. The electrolyte channel is necessary for the operation of the cell since the electrolyte has the ions required to complete the electrical circuit. Both types of cells, therefore, have voltage losses due to the resistance of the electrolyte. Decreasing the electrolyte channel width by placing the electrodes closer together reduces this electrolyte resistance but increases the difficulty in supplying sufficient electrolyte to allow the products to escape from the cell.

Electrodes can be made from rods, tubes, meshes and conductive particulates. However, for commercial high production rates the filterpress design with plate electrodes is most common. Porous three-dimensional electrodes having high surface area have been described. U.S. Pat. No. 6,086,733 describes an electrochemical cell with a porous material covering the cathode in which fluid is forced to travel and improve mass transfer. These electrodes are particularly useful for plating of very dilute species from aqueous waste waters. Unfortunately, with gas evolving reactions, porous electrodes are not desirable because they trap the gases produced and, hence, increase the resistance of the gas-filled electrolyte.

Other electrode shapes have been described to direct the flow of gas evolved from the electrode surface. U.S. Pat. No. 4,464,242 teaches the use of an electrode, which has essentially fins to direct the flow of gas and electrolyte. However, this electrode does not decrease electrolyte resistance in the cell.

U.S. Pat. No. 5,480,515 teaches the use of a shaped electrode to move electrolyte to the electrode surface under the influence of gas release by means of channels. The electrode design does not reduce the electrolyte resistance.

U.S. Pat. No. 4,424,106 teaches a shaped electrode for anodes and cathodes in a filter press cell stack for improvement of electrolyte and gas flow within the cell. Mixing and fluid flow are affected by the shaped electrodes but there is no reduction in cell resistance with this design.

U.S. Pat. No. 4,469,580 teaches an electrode design which increases surface area and is self-supporting. The increase in surface area is achieved by having a ribbon-like screen project into the flow channel. The screen must be used in a monopolar cell and must have flow on both sides of the electrode. The electrode shape is not suitable for narrow gap cell designs because of the physical width of the electrode and the need for electrolyte flow on both sides of the electrode. Any advantage in electrolyte resistance reduction due to projection of the screen ribbon structure will be offset by gas hold-up due to the same.

Thus, the prior art does not teach how to, both, reduce electrolyte resistance and to keep an open electrolyte channel for escape of gaseous products.

There is, therefore, a need for an improved electrode which addresses both of the aforesaid and other issues.

SUMMARY OF THE INVENTION

It is an object of the present invention to provide a bifurcated electrode that offers substantial improvements in voltage and efficiency in a water electrolyser cell. It also provides longer-term electrode stability, opportunity for periodic depolarization and increases cell efficiency. It also may utilize relatively cheap nickel and its fabrication is compatible with present cell designs.

Accordingly, in one aspect the invention provides an electrode of use in an electrolytic cell comprising:
- an electrically conductive first metal sheet having an electrochemically active gas-evolving planar surface;
- an electrically conductive second metal electrochemically active gas-evolving screen intimately adjacent and parallel to said planar surface to define an electrolyte and gas-evolving chamber between said sheet and said screen having a narrow width.

The term "screen" includes, for example, mesh, grid and the like. The term "sheet" includes, for example, plate, foil, or other members having a planar surface.

Preferably, the sheet has peripheral portions to which, upstanding, screen portions, are welded to form an electrode of unitary construction having an aqueous electrolyte and gas-evolving space, channel or chamber of a sufficiently narrow width as to be practicable in providing minimal inter sheet-screen separation. Useful efficacious widths are selected from 0.3 mm–2 cm.

The bifurcated electrode, according to the invention, reduces the electrolyte resistance, but still maintains an electrolyte flow channel for electrolyte movement and escape of reactant products. The bifurcated electrode is particularly suited to electrolysis which produces gases, since the presence of non-conductive gas bubbles in a narrow electrolyte flow channel increases cell resistance substantially for a conventional electrode. Thus, the bifurcated electrode has two, in effect, distinct structures wherein one part is a conventional or primary plate electrode and the second part is a metallic screen or perforated plate responsible for the reduction of cell resistance. The metallic screen is electrically connected to the primary plate, preferably, near the edge of the electrolyte-exposed active plate area and parallel to the flow channel and extends across the flow channel from the plate to a membrane/separator, then along the surface of the membrane/separator and returns to the electrode plate essentially covering the boundary of the flow channel wall, but not interfering with the flow channel. By virtue of the screen's contact with the electrode plate, the current is conducted to the electrolyte adjacent the membrane/separator and, thus, reduces the resistance path of the electrolyte. A similar arrangement can be used in the other electrode compartment to reduce the total cell resistance.

The bifurcated electrode, thus, increases the electrode surface area and provides an electrode which is placed very closely to the membrane/separator without blocking the electrolyte flow or creating a flow channel which is most often too small to permit product from being efficiently removed. The extension to the primary electrode must, of course, be of a material which is conductive and screen-like. While a conductive sponge placed in the electrolyte flow channel would provide reduced cell resistance, it would trap gaseous products leading to displacement of the electrolyte and reduction or termination of the electrochemical reaction. Thus, a primary benefit of the bifurcated electrode of the invention is that the flow channel is left open while the electrolyte resistance path is minimized. Thus, the term "screen" as used herein does not include sponge-like materials having pores.

The following benefits are also realized by the bifurcated electrode according to the invention.

The plate electrode in the case of monopolar cell designs carries the current into the cell so that the screen, which is, preferably, fully immersed in the electrolyte, can be of a lighter gauge material, since there is less current-carrying capacity needed. The smaller gauge also allows minimal interference with the electrolyte flow channel.

The bifurcated electrodes also provide for improved efficiency for the following two main reasons.

The electrode provides increased electrode surface area which results in a decrease in the true current density at the same nominal current density. Decreased current density decreases the activation overvoltage. For example, a 20 mesh screen with 0.38 mm diameter wire, the usable surface area is increased by 1.5 $cm^2/cm^2$. Based on the IR corrected polarization curve of a typical electrolysis cell, this decrease in the true current density decreases cell voltage by 90 mV at 95° C.

The decreased effective distance between electrodes results in a proportionate reduction in the contribution of the electrolyte resistance total cell resistance. Decreased electrolyte resistance decreases the resistive voltage drop. For example, assuming an effective distance reduction of 50%, the resistance decreases by 0.228 $ohm.cm^2$ at 95° C., which decreases the cell voltage by 114 mV at a current density of 500 $mA/cm^2$.

In both monopolar and bipolar cells, the bifurcated electrode has more surface area available than the simple plate electrode and hence, can operate at a lower current density with less corresponding energy loss. The surface area can be increased by surface roughening or by application of electrode coatings. However, the additional electrode area provided by the bifurcated electrode obviates the need for these measures or may provide additional electrode surface for roughening and coating.

The additional surface area provided by the bifurcated electrode without a coating provides an unexpected advantage for electrolytic processes that are intermittent in operation. High surface area coatings and catalyzed coatings often degrade when the cell potentials are allowed to be turned off. This scenario would be common with power from alternate energy sources, such as solar or wind or where the production is modulated to follow electrical grid power costs. The high surface area provided by the bifurcated electrode allows the electrodes to be operated without a highly activated surface and, thus, the electrodes are exceptionally rugged and do not suffer from surface coating degradation.

The bifurcated electrode may also provide support for the membrane/separator, if the screen is set touching the membrane/separator on both sides.

The bifurcated electrode can be used as either an anode or cathode or as both electrodes, as required by the electrolytic reactions conducted in the cell.

The screen portion of the bifurcated electrode may be designed to minimize resistance by being extended to the separator surface or to maximize fluid mixing in the flow channel by being extended only into the flow path of the electrolyte.

The screen material may be formed of the same material as the electrode plate to minimize galvanic corrosion effects, or be different from the electrode plate material to encourage catalysis of a desired reaction. For monopolar cells, the current carrying capacity of the screen material is not as critical as for the plate electrode since the screen electrode is, most preferably, inside the cell and is wetted and cooled by the electrolyte. Thus, a variety of materials may be considered for the screen which are not suitable for the plate electrode.

Cell construction with a bifurcated electrode is not more complicated than the conventional cell construction. The only added step is that the screen must be suitably shaped and electrically contacted with the plate electrode. Preferably, the screen is spot welded to the plate, though a simple pressure contact could also be effective if the screen was partially under a gasket such that the tightening of a cell stack provided sufficient pressure for the contact. It is preferable that the screen is stamped to form the shape of the flow channel before the attachment to the plate takes place.

In a further aspect, the invention provides an electrode as hereinabove defined comprising a further one or more screens adjacent the first screen and/or other screens in parallel relationship to provide similar electrolyte and gas-evolving chambers having similar inter-screen widths.

Accordingly, the invention further provides an electrode hereinbefore defined further comprising a plurality of second electrically conductive second metal electrochemically active gas-evolving screens parallel to said first screen, spaced one screen from another to define an inter-screen electrolyte and gas-evolving chamber between said screens having a narrow width.

Alternatively, the electrode sheet and the screen(s) may be rigidly held spaced apart, one from another, for example, by suitable spacers located at the screen edges in the cell walls.

The electrodes as hereinbefore defined are of particular use in electrolytic cells or electrolysers for the production of hydrogen and oxygen in aqueous potassium hydroxide electrolyte.

Accordingly, in a further aspect the invention provides an electrolytic cell comprising an electrode as hereinbefore defined, a separator frame having peripheral portions defining a central aperture constituting an electrolyte flow channel; and wherein said gas-evolving screen defining said electrolyte and gas-evolving chamber and said second gas-evolving screens defining said inter-screen chambers are received within said aperture.

Thus, to summarize, the invention provides an electrode having a recognizable three-dimensional structure which gives minimal flow channel obstruction and relatively large surface area. Minimal resistance is obtained because of the relatively narrow spacing of the electrode grid to the separator. The plate can provide high current density capacity with ease of external connections to a bus bar. Surface activation of the electrode is possible, if desired.

BRIEF DESCRIPTION OF THE DRAWINGS

In order that the invention may be better understood, a preferred embodiment will now be described by way of example only, with reference to the accompanying drawings wherein.

DETAILED DESCRIPTION OF A PREFERRED EMBODIMENT

Figure 1:
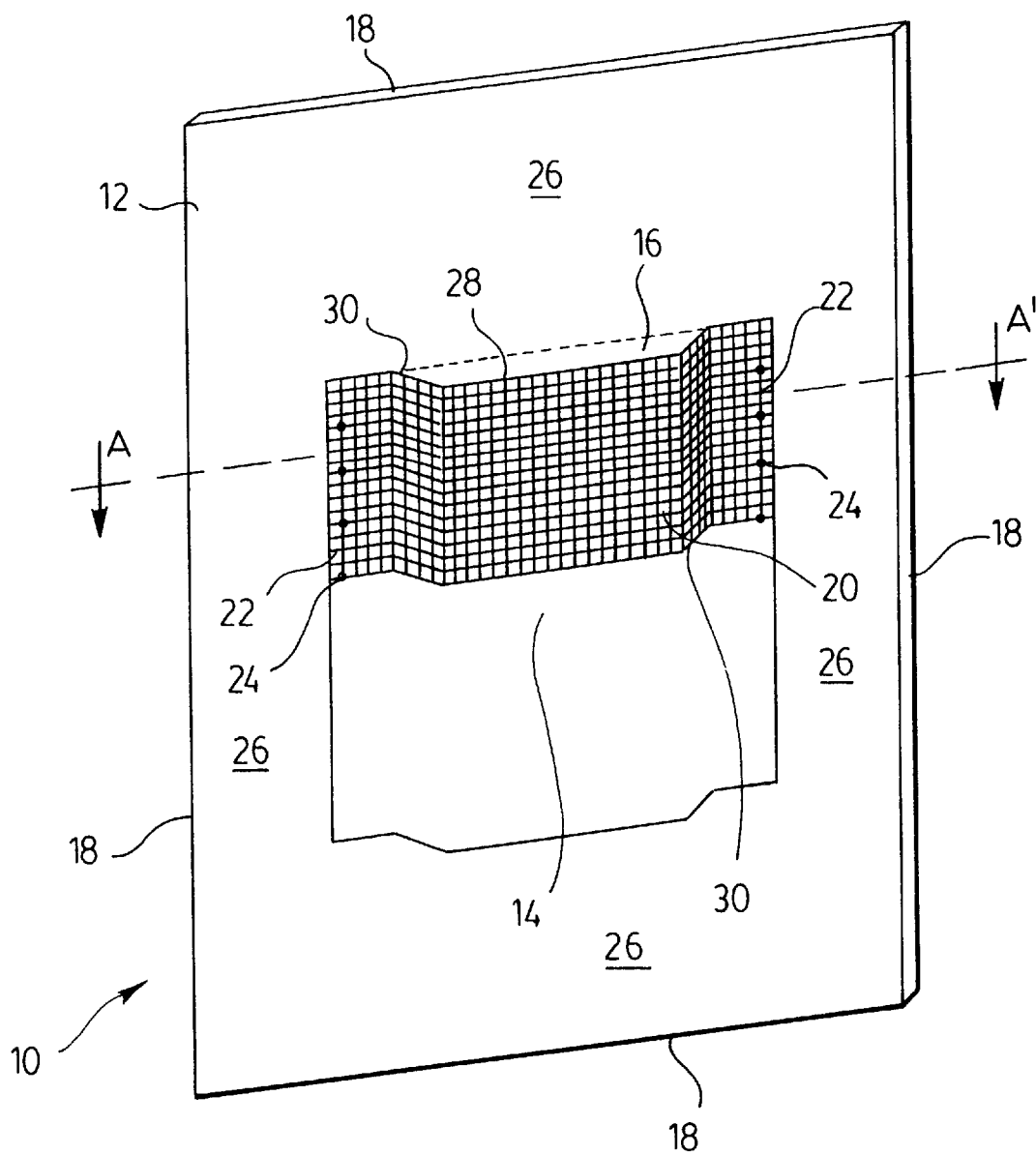
FIG. 1 is a diagrammatic, perspective view of a bifurcated electrode according to the invention.

With reference to FIG. 1, this shows generally as 10, a nickel anode electrode consisting of a nickel foil 12 having planar surfaces of dimensions 229 mm×150 mm×0.074 mm, which serves both as a current conductor into the gas evolving area 14 and as a gas evolving area substrate per se.

Overlaying and parallel to a face 16 of foil 12 adjacent at a narrow distance therefrom and remote from the periphery 18 of foil 12 is a nickel screen 20 of 20 mesh, 0.38 mm diameter wire. In the embodiment shown, screen 20 is spot-welded to foil 12 at the pair of screen edges 22 to form weld spots 24. Alternative electrical conductor connections may be used. Screen 20 is so shaped as to be raised at a distance of about 2.5 mm from face 14 for the maximum and very significant part of screen 20. Welds 24 form an electrical connection and also maintain the aforesaid slight arch in screen 20 to be distant from the foil to thus form bifurcated electrode 10. Screen 20 leaves a peripheral area 26 adjacent the full periphery of foil 12. The foil and screen essentially define therebetween an electrolyte and gas-evolving chamber 28. Screen 20 has short, gradually upstanding portions 30 of sufficient height, 2.4 mm in the embodiment shown, to provide the narrow displacement 28.

Figure 2:
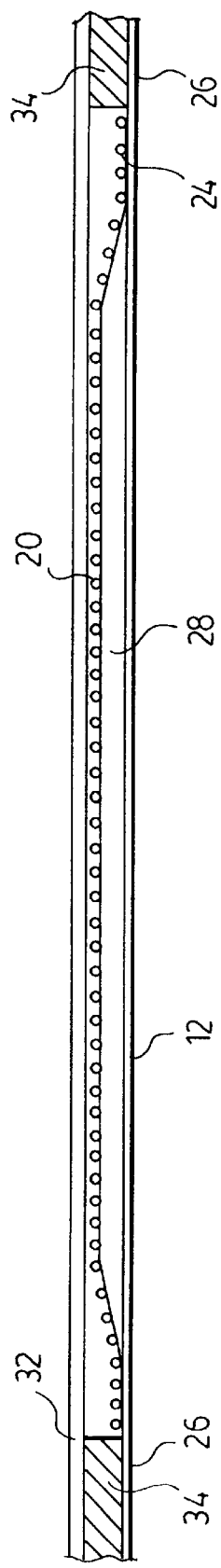
FIG. 2 is a diagrammatic horizontal cross-sectional view on the line A–A$^1$ of FIG. 1 of the electrode in a separator frame adjacent a separator membrane.

With reference to FIG. 2, this shows screen 20 adjacent to foil 12 as aforesaid described to produce chamber 28. Screen 20 is adjacent to separator membrane 32 attached to separator frame 34 at peripheral portion 26.

Figure 3:
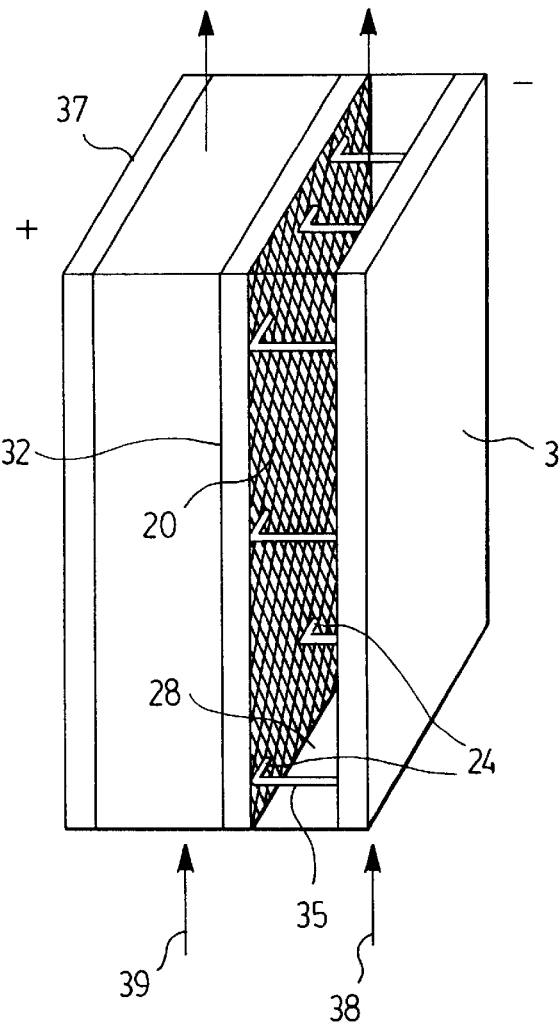
FIG. 3 is a diagrammatic perspective view of a parallel plate flow-through cell according to the invention.
Figure 5:
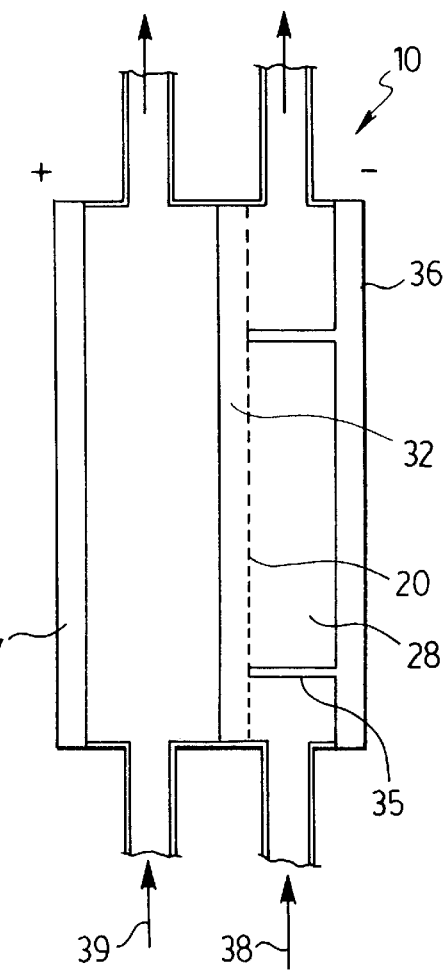
FIG. 5 is a diagrammatic side sectional view of a parallel plate flow-through cell according to the invention; and wherein the same numerals denote like parts.

FIG. 3 and FIG. 5 show, in exaggeration, a wide gap flow-through cell having bifurcated electrode 10 within anode chamber 28 by means of conductive standoff brackets 35. Thick plate anode 37, cathode 36 and separator membrane 32 provide space for anolyte flow 39 and catholyte flow 38. Screen 20 is parallel to and adjacent to separator membrane 32 and in electrical connection to cathode 36 by means of conductive electrical conductive standoffs 35, which have been spot welded at each end to provide connection to screen 20 and cathode plate 36. Standoffs 35 provide the significant benefit of allowing current to be directed to screen 20 near membrane 32 without having to pass through the electrolyte and suffer resistive losses.

Figure 4:
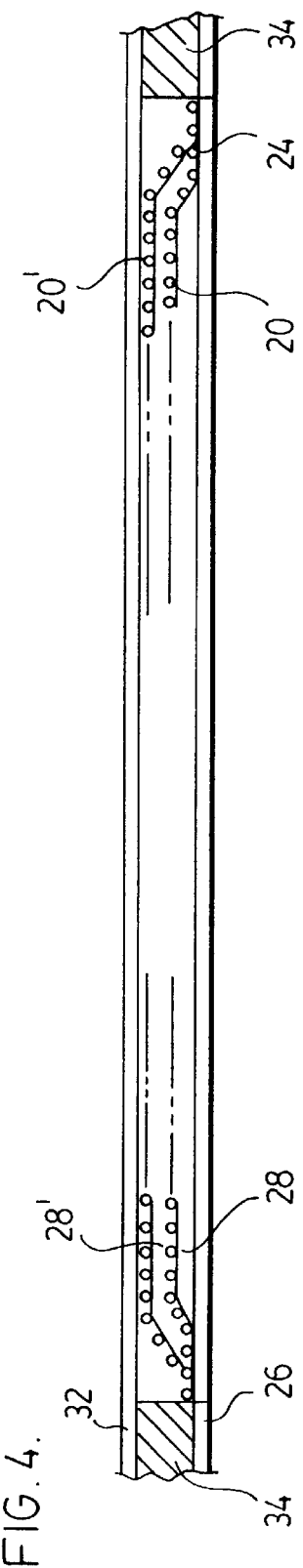
FIG. 4 is a diagrammatic horizontal cross-sectional view of an alternative embodiment of a bifurcated electrode in a separator frame having two screens according to the invention.

FIG. 4 shows the embodiment of FIG. 2 having an additional screen 20' adjacent in parallel relationship to screen 20 at a small distance of about 1.2 mm apart to define a second channel 28' therebetween.

When assembled in the cell stack, bifurcated electrode 10 fits into one of the compartments of the separator frame so that the screen lies adjacent to the surface of the separator and the foil forms one of the walls of the compartment. The axis of the arch may be either parallel or perpendicular to the direction of flow of the electrolyte.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. An electrode of use in an electrolytic cell comprising:
   an electrically conductive first metal sheet having an electrochemically active gas-evolving planar surface; and
   an electrically conductive second metal electrochemically active gas-evolving screen intimately adjacent and parallel to said planar surface to define an electrolyte and gas-evolving chamber between said sheet and said screen having a width selected from 0.3 mm to 2.0 cm, wherein said sheet has sheet portions and said screen has upstanding screen portions in contact with said sheet portions.

2. An electrode as defined in claim 1 of unitary construction wherein said sheet has peripheral sheet portions and said screen has upstanding peripheral portions rigidly joined to said peripheral sheet portions.

3. An electrode as defined in claim 2 wherein said upstanding peripheral screen portions are welded to said sheet portions.

4. An electrode as defined in claim 1 wherein said upstanding peripheral screen portions are welded to said sheet portions.

5. An electrode as defined in claim 1 wherein said first metal and said second metal are the same.

6. An electrode as defined in any claim 1 wherein said first metal is nickel.

7. An electrode as defined in claim 1 wherein said width is selected from 0.5–4.00 mm.

8. An electrolytic cell comprising an electrode as defined in claim 1, a separator frame having peripheral portions defining a central aperture constituting an electrolyte flow channel; and wherein said gas-evolving screen defining said electrolyte and gas-evolving chamber and said second gas-evolving screens defining said inter-screen chambers are received within said aperture.

9. An electrode of use in a electrolytic cell comprising:
   an electrically conductive first metal sheet having an electrochemically active gas-evolving planar surface;
   an electrically conductive second metal electrochemically active gas-evolving screen having a portion intimately adjacent and parallel to said planar surface to define an electrolyte and gas-evolving chamber between said sheet and said screen having a width selected from 0.3 mm to 2.0 cm; and
   a plurality of second electrically conductive second metal electrochemically active gas-evolving screens each having portions parallel to said first screen, spaced one screen from another to define and inter-screen electrolyte and gas-evolving chamber between said screens having a width selected from 0.3 mm to 2.0 cm.

10. An electrode as defined in claim 9 wherein each of said second screens has upstanding screen portions welded to an adjacent screen.

11. An electrolytic cell comprising an electrode as defined in claim 9, comprising a separator frame having peripheral portions defining a central aperture comprising an electrolyte flow channel, and wherein said gas-evolving screen defining said electrolyte and gas-evolving chamber and said second gas-evolving screens defining said inter-screen chambers are received within said aperture.

* * * * *